UNITED STATES PATENT OFFICE.

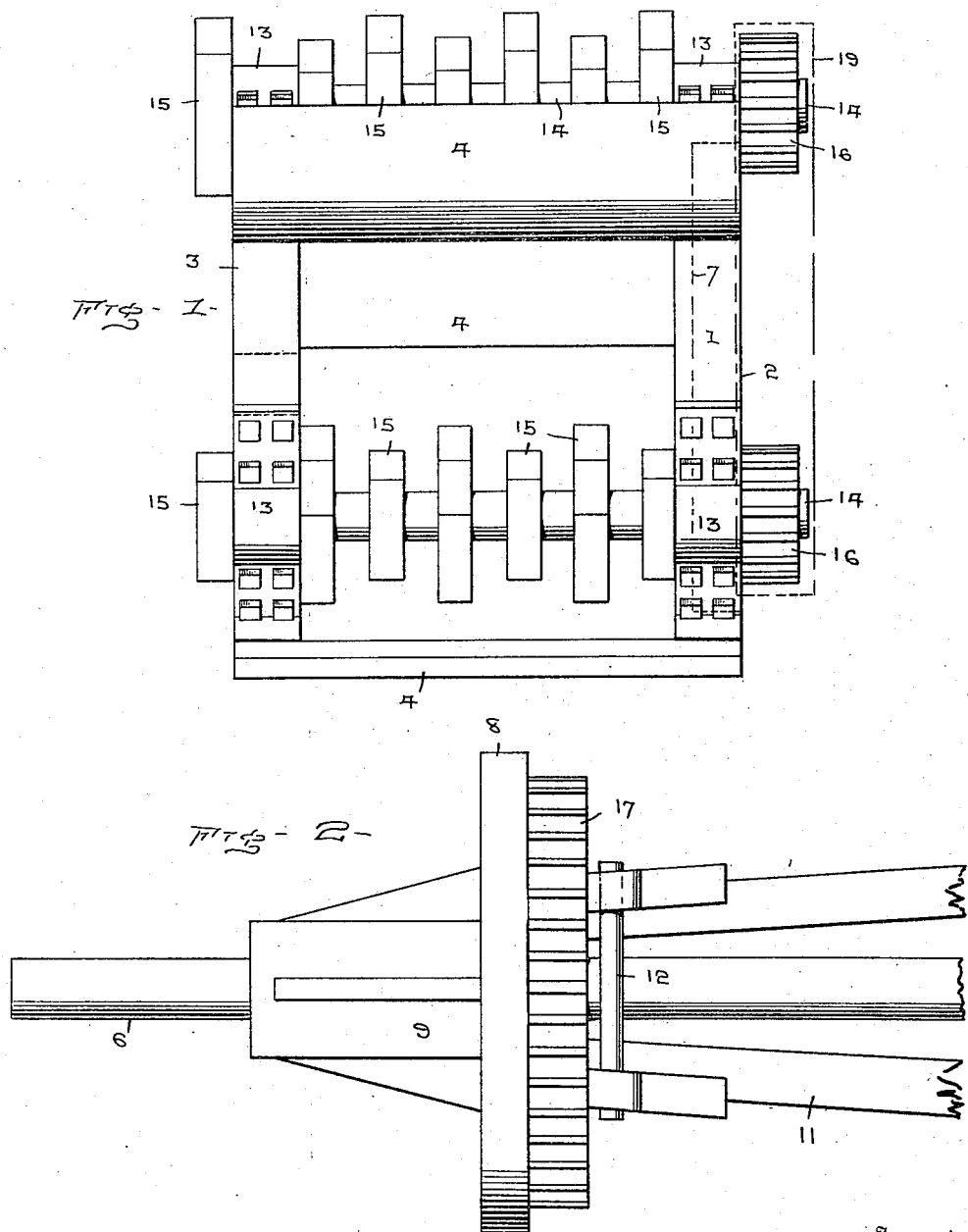

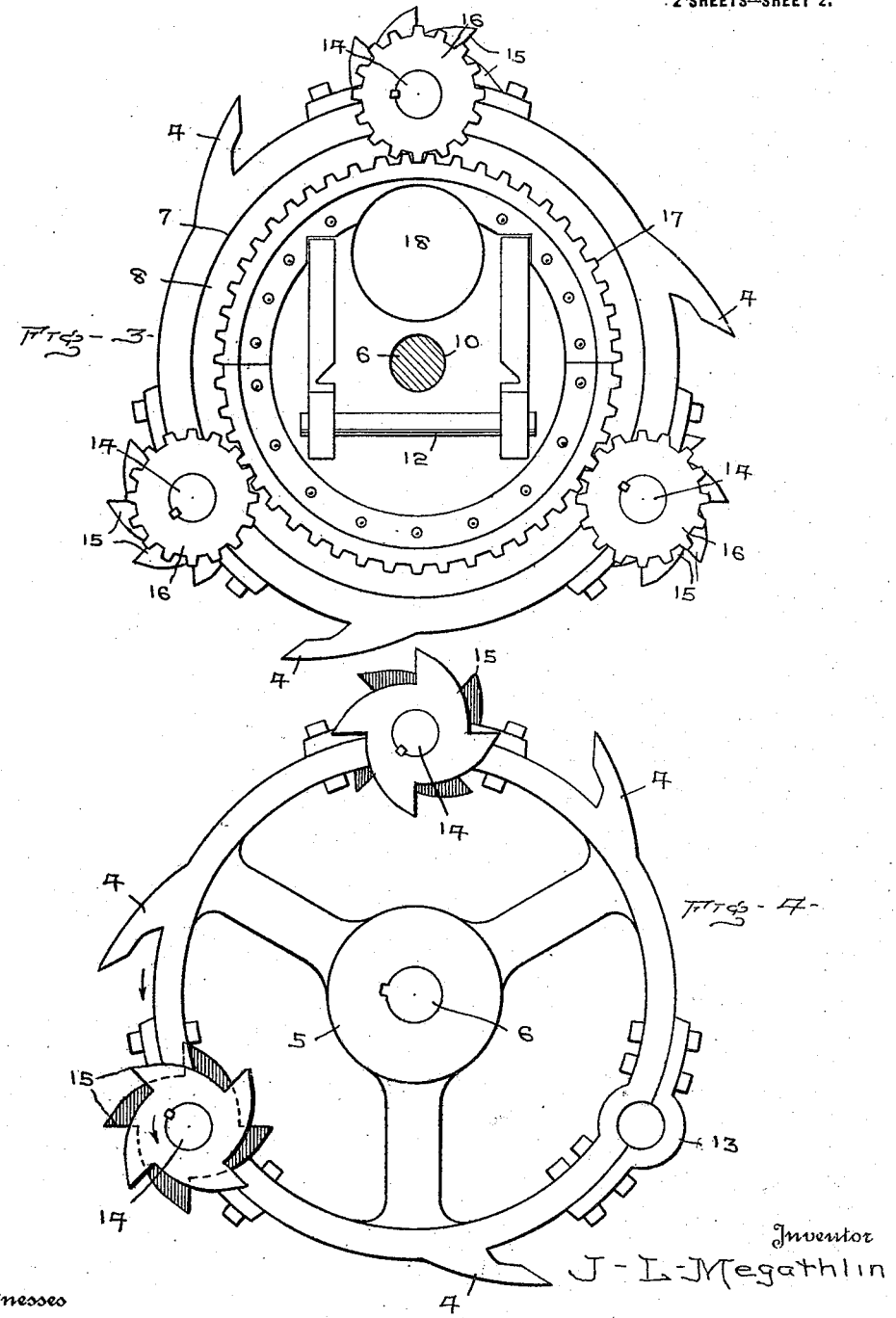

JESSE LEWIS MEGATHLIN, OF MIAMI, FLORIDA, ASSIGNOR OF ONE-FOURTH TO J. W. COOK, ONE-FOURTH TO J. A. PEGG, AND ONE-FOURTH TO J. A. WALDECK.

ROTARY CUTTER.

1,217,108.      Specification of Letters Patent.      Patented Feb. 20, 1917.

Application filed April 11, 1916. Serial No. 90,479.

*To all whom it may concern:*

Be it known that I, JESSE LEWIS MEGATHLIN, a citizen of the United States, residing at Miami, in the county of Dade and State of Florida, have invented certain new and useful Improvements in Rotary Cutters; and I do hereby declare the following to be a full, clear, and exact description of the invention, such as will enable others skilled in the art to which it appertains to make and use the same.

My invention relates to new and useful improvements in rotary cutters and more particularly to that class adapted to be used for loosening soil, gravel, rock and similar substances and is adapted primarily for use in connection with a dredging machine, and my object is to provide a rotary cutting head and mount the same upon the end of a frame.

A further object is to provide a plurality of cutting disks and rotatably mount the same upon the cutting head whereby they will be carried in a circular path with the cutter head and in advance of the cutting teeth of the cutter head.

A further object is to provide means for rotating the cutting disks independently of the rotation of the cutter head and at a greater speed than the rotating speed of the cutter head.

And a further object is to provide means to cause the disks to rotate in the same direction of travel as the teeth of the cutter head.

Other objects and advantages will be hereinafter set forth and more particularly pointed out in the accompanying specification.

In the accompanying drawings which are made a part of this application,

Figure 1 is a top plan view of the cutter head removed from its support.

Fig. 2 is a plan view of the support for the cutter head showing the gear for operating the cutting disk.

Fig. 3 is an end elevation of the cutter head, and

Fig. 4 is a similar view of the opposite end of the cutter head.

Referring to the drawings in which similar reference numerals designate corresponding parts throughout the several views, 1 indicates the cutter head which preferably comprises cylindrical ring sections 2 and 3 which are connected together by cutting blades 4, said ring sections and cutting blades forming a substantially cylindrical body.

The ring section 3 is provided with a hub 5 which is mounted upon one end of a driving shaft 6, while the ring section 2 is provided with a circular seat 7 with which engages a collar 8 carried by a frame structure 9, said frame structure having an opening 10 through its axial center through which the shaft 6 projects, the collar 8 forming a bearing for the inner end of the cutter head. The frame structure 9 is attached to beams 11, said beams supporting the frame work and shaft 6, the beam structure being of the usual formation employed with dredges and the like, the inner ends of the beams being preferably hinged so that the outer end of the beam can be raised or lowered to regulate the position of the cutter head, the frame structure 9 having a rod 12 to which a cable (not shown) or other similar device may be attached for raising and lowering the beam structure.

Mounted upon the periphery of the ring sections 2 and 3 are boxings 13 through which extend shafts 14, said shafts having a plurality of cutting disks 15 mounted thereon and adapted to rotate with the shaft, the teeth of one cutting disk being staggered with relation to the teeth of the next succeeding disk, the cutting faces of said disks being at right angles to the cutting edges of the blades 4.

The shafts 14 and disks carried thereby are rotated by attaching gears 16 to the inner ends of said shafts, which gears mesh with a cog wheel 17 carried by the collar 8, said cog wheel being preferably constructed of segmental rack sections, which when properly assembled form a circular cog.

The shafts 14 and cutting disks carried thereby are caused to rotate in the same direction as the line of travel of the cutting blades 4 and at a much greater speed than the travel of the cutter head, said cutting disks forming channels in the soil, rocks, or whatever substance is encountered, so that when the cutting blades 4 encounter the strips of soil, etc., left by the cutting disk, they will be readily removed and separated from the main body by the cutting blades.

In operation, power is applied to the shaft 6, after which the cutter head is lowered into operative position or until the cutting blades and cutting disks are in engagement with the soil or other substance to be removed, and in view of the rotation of the cutter head and the cutting disks the object encountered thereby will be disintegrated so that it can be immediately removed by suction or otherwise, and in view of the rapidity with which the disks 15 are rotated, extremely hard substances will be cut into strips or so channeled that the cutting blades will readily remove the projecting portions of the solid object, and when smaller stones or solid particles are encountered, the cutting disks will either break them up or throw them out of the path of the cutting blades. Should pieces of stone or solid particles pass within the cutter head, an enlarged opening 18 is formed through the collar 8 so that said particles will readily pass out of the cutting head.

In order to prevent soil, or other foreign particles from coming in contact with the gears 16 and cog 17, a shield 19 may be placed over said gears and cog, as shown by dotted lines in Fig. 1.

This form of device can be very cheaply constructed and in view of the rapid speed or rotation of the cutting disks the substances will be thoroughly disintegrated while the cutting blades will readily move the disintegrated particles into position to be removed by suction or otherwise.

Having thus fully described my invention what I claim as new and desire to secure by Letters Patent of the United States, is:—

1. In a rotary cutter, the combination with a cutter head having cutting blades, and means to rotate the cutter head, of a plurality of rotatable shafts extending parallel to the cutting blades and journaled on the cutter head, a plurality of cutting disks attached to each shaft, and means to rotate said shafts at a greater speed than that of the cutter head.

2. A rotary cutter comprising the combination with a rotary cutter head, a plurality of cutting blades attached to said head, and a drive shaft to which the cutter head is attached, of a plurality of shafts rotatably attached to the cutter head, a plurality of cutting disks attached to each of said latter shafts, and means to rotate the shafts carrying the cutting disks in at a greater rate of speed and in the same direction as the cutter head.

3. A rotary cutter comprising the combination with a cutter head formed of a pair of ring sections, and cutting blades connecting said ring sections, of a plurality of shafts rotatably mounted on said ring sections, a plurality of cutting disks carried by each shaft, and means to cause said shafts and cutting disks to rotate in the same direction as the rotation of the cutter head when said cutter head is rotated.

4. A cutting device comprising the combination with a shaft, a frame structure on said shaft, a collar carried by the frame structure, and a cog wheel on said collar, of a cutter head having a seat in one end for the reception of the collar, said cutter head being fixed to the shaft, a plurality of shafts rotatably mounted on the cutter head, a plurality of cutting disks carried by each of said latter shafts, and gears attached to said latter shafts and meshing with said cog wheel adapted to rotate said latter shafts when the cutter head is rotated.

In testimony whereof I have signed my name to this specification.

JESSE LEWIS MEGATHLIN.

Copies of this patent may be obtained for five cents each, by addressing the "Commissioner of Patents, Washington, D. C."